(12) United States Patent
Li et al.

(10) Patent No.: US 10,824,034 B1
(45) Date of Patent: Nov. 3, 2020

(54) DISPLAY MODULE

(71) Applicant: Au Optronics Corporation, Hsinchu (TW)

(72) Inventors: Chao-Wei Li, Hsinchu (TW); Ju-Chin Chen, Taipei (TW); Syuan-Ling Yang, Kaohsiung (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 16/726,155

(22) Filed: Dec. 23, 2019

(30) Foreign Application Priority Data

May 28, 2019 (TW) .............................. 108118362 A

(51) Int. Cl.
  *G02F 1/136* (2006.01)
  *G02F 1/1362* (2006.01)
  *G02F 1/1335* (2006.01)
(52) U.S. Cl.
  CPC ...... *G02F 1/1362* (2013.01); *G02F 1/133536* (2013.01); *G02F 2202/16* (2013.01)
(58) Field of Classification Search
  None
  See application file for complete search history.

(56) References Cited

U.S. PATENT DOCUMENTS

| | | | |
|---|---|---|---|
| 6,317,188 B1 | 11/2001 | Shibahara | |
| 7,102,708 B2 | 9/2006 | Johgan et al. | |
| 7,522,252 B2 | 4/2009 | Johgan et al. | |
| 2004/0021808 A1* | 2/2004 | Johgan | G02F 1/13394 349/106 |
| 2006/0256274 A1 | 11/2006 | Johgan et al. | |
| 2012/0268671 A1* | 10/2012 | Inoue | G02F 1/13394 349/15 |

FOREIGN PATENT DOCUMENTS

| | | |
|---|---|---|
| CN | 1237379 | 1/2006 |
| CN | 107479257 | 12/2017 |
| WO | 2017029872 | 2/2017 |

\* cited by examiner

*Primary Examiner* — James A Dudek
(74) *Attorney, Agent, or Firm* — JCIPRNET

(57) ABSTRACT

A display module includes a display panel and an electronically controlled shutter including polarizers, conductive layers, supporting members, and a display medium layer. Each pixel of the display panel has a first edge and a second edge. A shape unit composed of any four supporting members adjacent to one another has a third edge and a fourth edge. An angle between the third edge and the first edge is larger than or equal to 0 degrees. An angle between the fourth edge and the second edge is larger than 0 degrees. Lengths of the first, second, third, and fourth edges are respectively X, Y, X', and Y'. Any four supporting members adjacent to one another satisfy at least one of Condition 1: X'>X and X'≠nX; and Condition 2: Y'>Y and Y'≠nY, wherein n is a positive integer.

9 Claims, 2 Drawing Sheets

DISPLAY MODULE

CROSS-REFERENCE TO RELATED APPLICATION

This application claims the priority benefit of Taiwan application serial no. 108118362, filed on May 28, 2019. The entirety of the above-mentioned patent application is hereby incorporated by reference herein and made a part of this specification.

BACKGROUND OF THE INVENTION

Field of the Invention

The disclosure relates to a photoelectric module, and more particularly, to a display module.

Description of Related Art

The multiple pixels in the display panel are generally arranged periodically. When the display panel is stacked together with components in the display module which are also periodically arranged, a Moiré may be generated, which results in undesirable display quality of the display module.

SUMMARY OF THE INVENTION

The invention provides a display module which exhibits excellent display quality.

A display module of the invention includes a display panel and an electronically controlled shutter. The display panel includes a plurality of pixels. The electronically controlled shutter overlaps with the display panel. The electronically controlled shutter includes a first polarizer, a second polarizer, a first conductive layer, a second conductive layer, a plurality of supporting members, and a display medium layer. The first conductive layer and the second conductive layer are located between the first polarizer and the second polarizer. The supporting members are located between the first conductive layer and the second conductive layer to form a cell gap for accommodating the display medium layer. Each of the pixels has a first edge and a second edge adjacent to the first edge. A shape unit composed of any four supporting members adjacent to one another among the supporting members has a third edge and a fourth edge adjacent to the third edge. An angle between the third edge and the first edge is larger than or equal to 0 degrees. An angle between the fourth edge and the second edge is larger than 0 degrees. Lengths of the first edge and the second edge are respectively X and Y. Lengths of the third edge and the fourth edge are respectively X' and Y'. Any four supporting members adjacent to one another satisfy at least one of Condition 1 and Condition 2. Condition 1: $X'>X$ and $X'\neq nX$; Condition 2: $Y'>Y$ and $Y'\neq nY$, where n is a positive integer.

In an embodiment of the invention, any four supporting members adjacent to one another satisfy both Condition 1 and Condition 2.

In an embodiment of the invention, the second polarizer is a reflective polarizer.

In an embodiment of the invention, the shape unit is in a shape of a parallelogram. The shape unit includes two of the third edges and two of the fourth edges. Any two adjacent shape units share one of the third edges or one of the fourth edges.

In an embodiment of the invention, two adjacent shape units sharing the third edge are mirror-symmetrical on two sides of the third edge.

In an embodiment of the invention, a length of an orthographic projection of the fourth edge on the third edge is smaller than the length of the third edge.

In an embodiment of the invention, the angle between the third edge and the first edge is equal to 0 degrees, and the angle between the fourth edge and the second edge is larger than 0 degrees.

In an embodiment of the invention, the angle between the third edge and the first edge is larger than 0 degrees, and the angle between the third edge and the first edge is smaller than or equal to the angle between the fourth edge and the second edge.

In an embodiment of the invention, $X'\neq Y'$.

In an embodiment of the invention, the supporting members are arranged in a matrix, and the matrix is composed of a plurality of the shape units.

Based on the above, in the embodiments of the invention, by configuring the arrangement pitch of the plurality of supporting members to be larger than the arrangement pitch of the pixels and arranging the plurality of supporting members in a staggered manner, the Moiré phenomenon resulting from stacking together components of two periodic arrangements can be improved. Therefore, the display module of the embodiments of the invention can exhibit excellent display quality.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
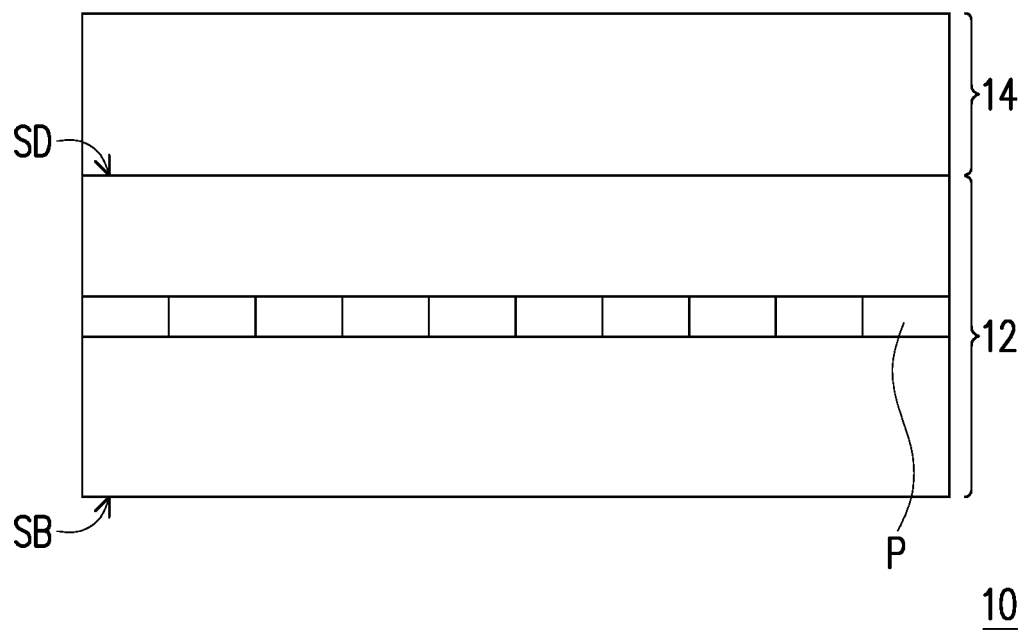
FIG. 1 is a partial cross-sectional view of a display module according to an embodiment of the invention.

The directional terminology (e.g., "above", "below", "front", "back", "left", and "right") mentioned in the embodiments only refers to the directions of the accompanying drawings. Therefore, the directional terminology as used is intended to illustrate, rather than limit, the invention. In the drawings, the figures show typical features of the methods, structures, and/or materials used in the particular exemplary embodiments. However, the drawings are not to be interpreted as defining or limiting the scope or nature of the exemplary embodiments. For example, for clarity, the relative size, thickness, and location of the various layers, regions, and/or structures may be reduced or magnified. It should be understood that when a device such as a layer, film, region, or substrate is referred to as being "on" or "connected to" another device, it may be directly on or connected to another device, or intervening devices may also be present. In contrast, when a device is referred to as being "directly on" or "directly connected to" another device, there are no intervening devices present. As used herein, the term "connected" may refer to physical connection and/or electrical connection. Besides, if two devices are "electrically connected" or "coupled", it is possible that other devices are present between these two devices.

In the exemplary embodiments provided herein, the same or similar elements will be given the same or similar reference numerals and their description will be omitted. In addition, the features in the different exemplary embodiments may be combined with each other as long as there is no conflict, and equivalent changes and modifications made according to the specification or claims are still within the scope of this disclosure. Moreover, "first", "second", and similar terms mentioned in the specification or the claims are merely used to name the discrete elements or to differentiate among different embodiments or ranges. Therefore, the terms should not be regarded as limiting the upper or lower bound of the number of the components/devices and should not be used to limit the manufacturing sequence or arrangement sequence of components.

The term "about," "approximately," or "substantially" as used herein is inclusive of the stated value and means within an acceptable range of deviation for the particular value as determined by people having ordinary skill in the art, considering the measurement in question and the error associated with measurement of the particular quantity (i.e., the limitations of the measurement system). For example, "about" may mean within one or more standard deviations, for example, ±30%, ±20%, ±10%, or ±5% of the stated value. Moreover, a relatively acceptable range of deviation or standard deviation may be chosen for the term "about," "approximately," or "substantially" as used herein based on optical properties, etching properties or other properties, instead of applying one standard deviation across all the properties.

FIG. 1 is a partial cross-sectional view of a display module 10 according to an embodiment of the invention. Referring to FIG. 1, the display module 10 includes a display panel 12 and an electronically controlled shutter 14. The display panel 12 is adapted to provide a display beam (not shown). Specifically, the display panel 12 includes a plurality of pixels P. Each pixel P may include a plurality of sub-pixels (not shown in FIG. 1; please refer to FIG. 3 and FIG. 4), such as a red sub-pixel P1, a green sub-pixel P2, and a blue sub-pixel P3, but the invention is not limited thereto. Each sub-pixel may be independently controlled to form a desired display image.

The display panel 12 may be a display panel of any type, such as a liquid crystal display panel, an organic light-emitting display panel, or a micro-light-emitting diode display panel, but the invention is not limited thereto. The display panel 12 has a display surface SD and a back surface SB. The display surface SD is a surface from which the display panel 12 outputs the display beam, and the back surface SB is a surface opposite to the display surface SD.

The electronically controlled shutter 14 overlaps with the display panel 12. In the present embodiment, the electronically controlled shutter 14 is disposed on the display surface SD of the display panel 12. However, in another embodiment, the electronically controlled shutter 14 may be disposed on the back surface SB of the display panel 12. In other words, the positions of the electronically controlled shutter 14 and the display panel 12 may be reversed.

The electronically controlled shutter 14 is adapted to control a usage mode of the display module 10. For example, the display module 10 may have a display mode and a reflective mode, and the display module 10 may be switched between the display mode and the reflective mode by turning on the electronically controlled shutter 14 or turning off the electronically controlled shutter 14. Further, the electronically controlled shutter 14 may have a transmissive state and a reflective state, and the electronically controlled shutter 14 may be switched between the transmissive state and the reflective state through electronic control. When the display module 10 is switched to the display mode, the electronically controlled shutter 14 may be switched to the transmissive state. At this time, the electronically controlled shutter 14 allows the display beam output by the display panel 12 to pass, so the user sees the display image. On the other hand, when the display module 10 is switched to the reflective mode, the electronically controlled shutter 14 may be switched to the reflective state. At this time, the electronically controlled shutter 14 is equivalent to a reflective mirror which shields the display beam output by the display panel 12 and reflects the ambient beam from outside, so the user sees an environmental image reflected by the electronically controlled shutter 14.

Figure 2:
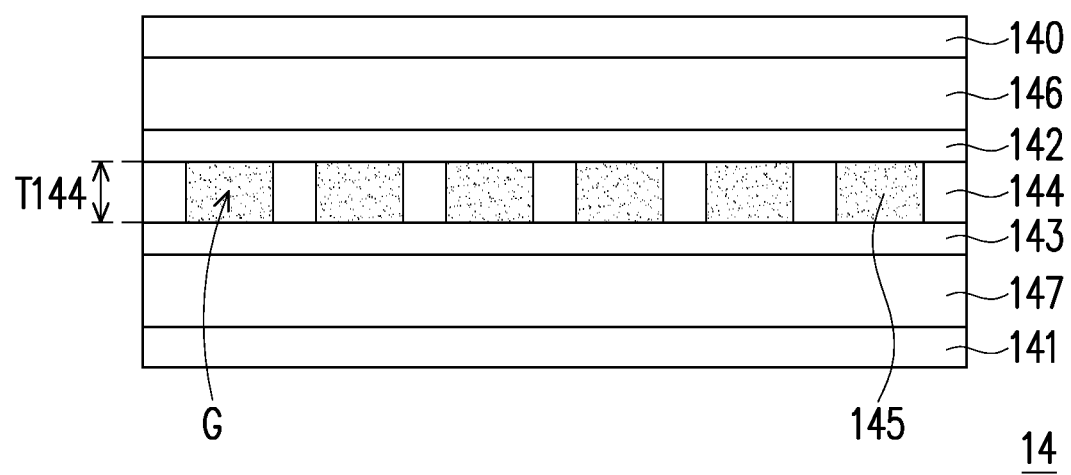
FIG. 2 is a partial cross-sectional view of an electronically controlled shutter in FIG. 1.

FIG. 2 is a partial cross-sectional view of the electronically controlled shutter 14 in FIG. 1. It is noted that FIG. 2 only schematically illustrates one implementation form of the electronically controlled shutter 14, and the implementable form of the electronically controlled shutter 14 is not limited to that shown in FIG. 2.

Referring to FIG. 2, the electronically controlled shutter 14 includes a first polarizer 140, a second polarizer 141, a first conductive layer 142, a second conductive layer 143, a plurality of supporting members 144, and a display medium layer 145. The first conductive layer 142 and the second conductive layer 143 are located between the first polarizer 140 and the second polarizer 141. The plurality of supporting members 144 are located between the first conductive layer 142 and the second conductive layer 143 to form a cell gap G for accommodating the display medium layer 145 between the first conductive layer 142 and the second conductive layer 143.

The first polarizer 140 and the second polarizer 141 are adapted to control the amount of light beam output from the electronically controlled shutter 14. Specifically, when the polarization state of the light beam is parallel to the transmission axis of the polarizer, the light beam can pass through the polarizer; when the polarization state of the light beam is perpendicular to the transmission axis of the polarizer, the light beam is shielded by the polarizer (e.g., being absorbed or reflected by the polarizer); when the polarization state of the light beam is neither parallel nor perpendicular to the transmission axis of the polarizer, a part of the light beam passes through the polarizer and another part of the light beam is shielded by the polarizer. Taking an absorptive polarizer (reflective polarizer) as an example, when the polarization state of the light beam is perpendicular to the transmission axis of the absorptive polarizer (reflective polarizer), the absorptive polarizer (reflective polarizer) absorbs (reflects) the light beam; when the polarization state of the light beam is parallel to the transmission axis of the absorptive polarizer (reflective polarizer), the absorptive polarizer (reflective polarizer) allows the light beam to pass. In the present embodiment, the first polarizer 140 is, for example, an absorptive polarizer, and the second polarizer 141 is, for example, a reflective polarizer. Further, the transmission axes of the first polarizer 140 and the second polarizer 141 are, for example, perpendicular to each other.

The first conductive layer 142 and the second conductive layer 143 are adapted to control the state of the display medium layer 145. For example, by applying a voltage to at least one of the first conductive layer 142 and the second conductive layer 143, a potential difference is created between the first conductive layer 142 and the second conductive layer 143 to thereby control the state of the display medium layer 145. In order to avoid affecting the transmission of the light beam, the first conductive layer 142 and the second conductive layer 143 may be made of a light-transmitting conductive material. The light-transmitting conductive material is, for example, a metal oxide, but the invention is not limited thereto.

The plurality of supporting members 144 are adapted to maintain the cell gap G for accommodating the display medium layer 145 between the first conductive layer 142 and the second conductive layer 143. FIG. 2 schematically shows that a thickness T144 of each supporting member 144 is equal to the depth of the cell gap G. However, in another embodiment, the thickness of a part of the supporting members 144 may also be smaller than the depth of the cell gap G. In other words, supporting members of different thicknesses may be adopted, wherein the thicker supporting members are adapted to maintain the cell gap G, and the thinner supporting members may provide support when the display module is pressed.

The display medium layer 145 may be a liquid crystal layer. The liquid crystal layer may include twisted nematic liquid crystal molecules, but the invention is not limited thereto. In the case where no potential difference is present between the first conductive layer 142 and the second conductive layer 143 (e.g., when the electronically controlled shutter 14 is switched to the reflective state), the twisted nematic liquid crystal molecules are substantially aligned upright. Therefore, after the light beam passes through the display medium layer 145, no phase delay is generated. In other words, before and after passing through the display medium layer 145, the polarization state of the light beam is substantially the same. Under this architecture, the display beam which comes from the display panel 12 (see FIG. 1) and sequentially passes through the second polarizer 141 and the display medium layer 145 has a polarization state which is perpendicular to the transmission axis of the first polarizer 140, so the display beam cannot pass through the first polarizer 140 (e.g., being absorbed by the first polarizer 140). On the other hand, the ambient beam which comes from outside of the display module 10 (see FIG. 1) and sequentially passes through the first polarizer 140 and the display medium layer 145 has a polarization state which is perpendicular to the transmission axis of the second polarizer 141, so the ambient beam is reflected by the second polarizer 141. The ambient beam reflected by the second polarizer 141 passes through the display medium layer 145 again and is emitted from the first polarizer 140.

In the case where a potential difference is present between the first conductive layer 142 and the second conductive layer 143 (e.g., when the electronically controlled shutter 14 is switched to the transmissive state), the twisted nematic liquid crystal molecules are tilted due to the electric field, thereby generating a phase delay effect and causing the polarization state of the light beam to change (e.g., being rotated by 90 degrees). Under this architecture, the display beam which comes from the display panel 12 (see FIG. 1) and sequentially passes through the second polarizer 141 and the display medium layer 145 has a polarization state which is parallel to the transmission axis of the first polarizer 140, so the display beam can pass through the first polarizer 140. On the other hand, the ambient beam which comes from outside of the display module 10 (see FIG. 1) and sequentially passes through the first polarizer 140 and the display medium layer 145 has a polarization state which is parallel to the transmission axis of the second polarizer 141, so the ambient beam passes through the second polarizer 141. The ambient beam passing through the second polarizer 141 may be absorbed by the light absorbing material and/or component in the display panel 12 (see FIG. 1).

Depending on different requirements, the electronically controlled shutter 14 may further include other components. For example, the electronically controlled shutter 14 may further include a carrier, such as a first substrate 146 and a second substrate 147. The first polarizer 140 and the first conductive layer 142 are respectively disposed on opposite surfaces of the first substrate 146, and the second polarizer 141 and the second conductive layer 143 are respectively disposed on opposite surfaces of the second substrate 147. In order to avoid affecting the transmission of the light beam, the first substrate 146 and the second substrate 147 are made of a light-transmitting material, such as glass or plastic, but the invention is not limited thereto.

Depending on different requirements, the electronically controlled shutter 14 may further include any known film layers, such as an alignment layer, a flat layer, a peripheral circuit layer, and a light shielding layer, but the invention is not limited thereto. Reference may be made to the related art for relevant descriptions of the above film layers, which will not be repeatedly described herein.

Figure 3:
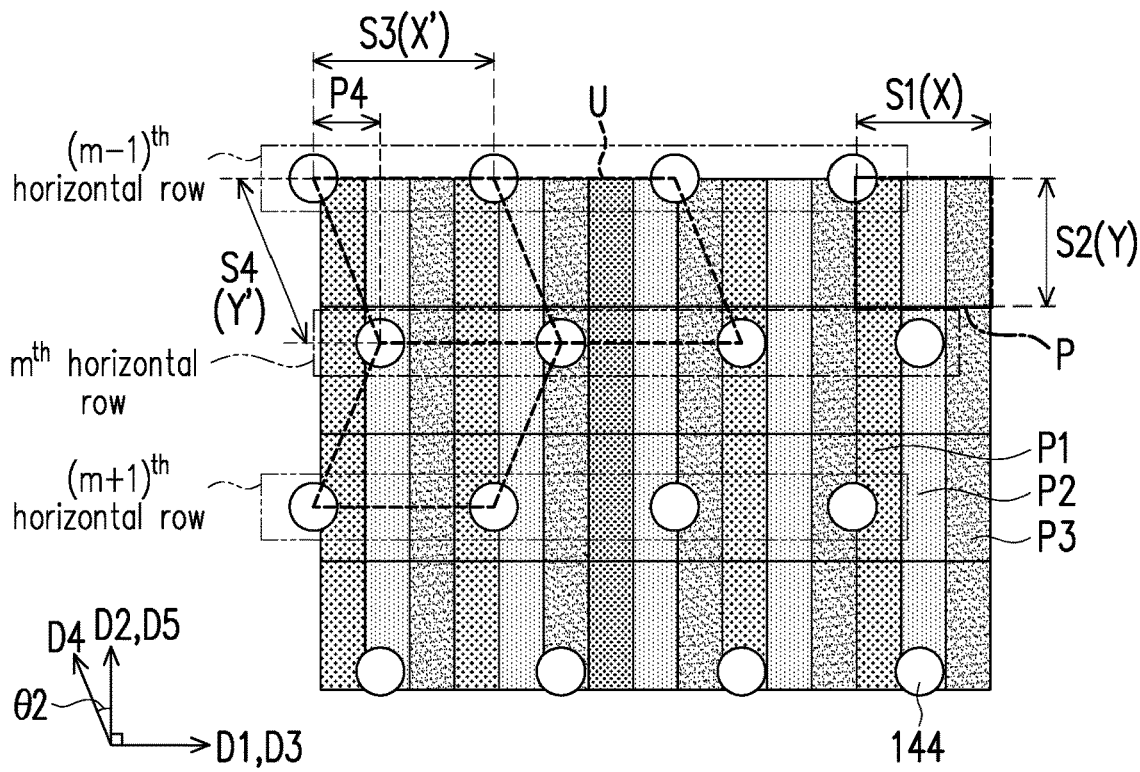
FIG. 3 and FIG. 4 are respectively two schematic partial top views after a plurality of pixels of the display module in FIG. 1 and a plurality of supporting members in FIG. 2 are stacked.
Figure 4:
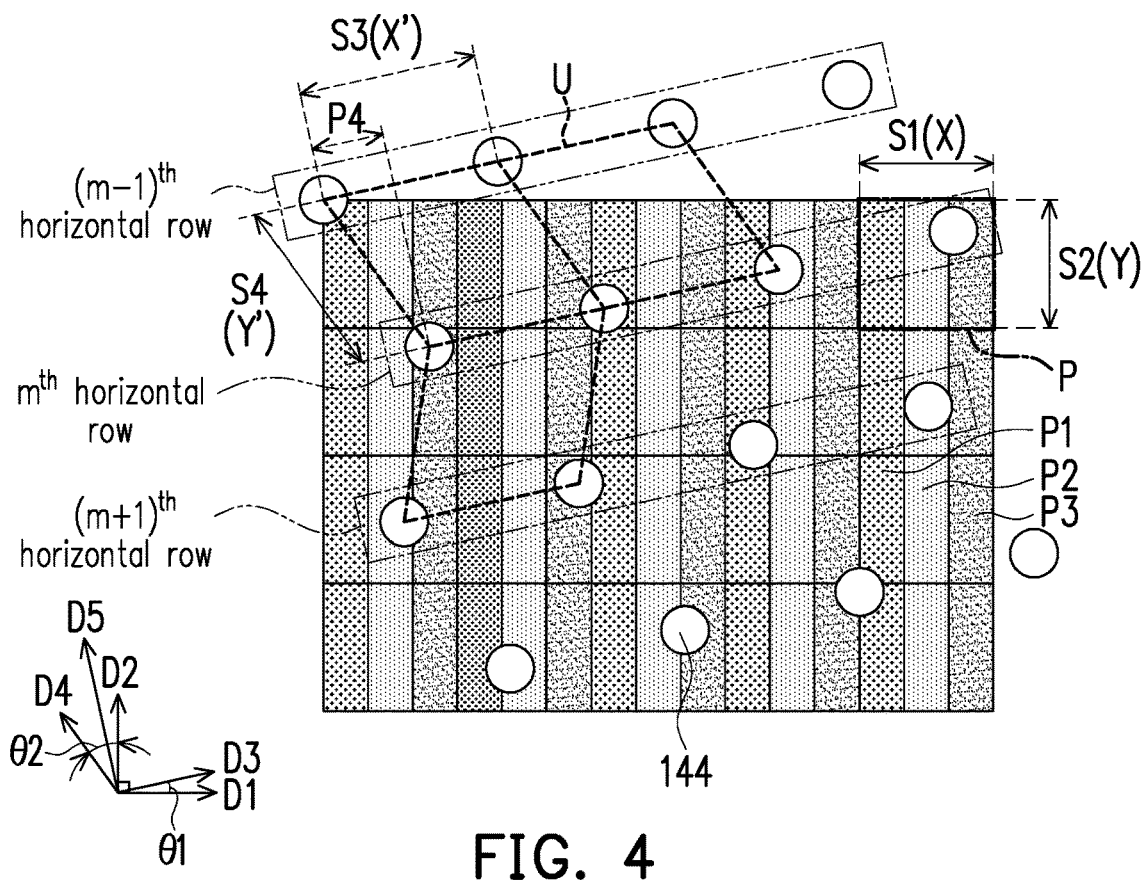

A specific design for improving the Moiré phenomenon will be described below with reference to FIG. 3 and FIG. 4. FIG. 3 and FIG. 4 are respectively two schematic partial top views after the plurality of pixels P of the display module 10 in FIG. 1 and the plurality of supporting members 144 in FIG. 2 are stacked.

Referring to FIG. 2 to FIG. 4, generally, the material of the supporting member 144 is a homogeneous light-transmitting material. In other words, the light beam passing through the supporting member 144 does not undergo a phase delay. Therefore, when a potential difference is present between the first conductive layer 142 and the second conductive layer 143, the display panel will have dark spots at positions corresponding to the plurality of supporting members 144. In addition, since the supporting member 144 affects the tilting state (including the direction and the angle) of the liquid crystal molecules around it, when a potential difference is present between the first conductive layer 142 and the second conductive layer 143, dark lines will appear around the plurality of supporting members 144. In a design where the arrangement cycle of the plurality of supporting members 144 is an integral multiple of the arrangement cycle of the plurality of pixels P, when the user views the display panel, if the arrangement distribution of the plurality of supporting members 144 and the arrangement distribution of the plurality of pixels P in the display panel are staggered, the Moiré phenomenon is visually generated, which adversely affects the display quality.

In order to improve the above Moiré phenomenon, as shown in FIG. 3 and FIG. 4, the arrangement pitch of the plurality of supporting members 144 are larger than the arrangement pitch of the pixels P, and the plurality of supporting members 144 are arranged in a staggered manner.

In detail, each pixel P has a first edge S1 and a second edge S2 adjacent to the first edge S1. In the present embodiment, an extending direction D1 of the first edge S1 is parallel to the arrangement direction of the plurality of sub-pixels (including the red sub-pixel P1, the green sub-pixel P2, and the blue sub-pixel P3) in each pixel P. Moreover, an extending direction D2 of the second edge S2 is parallel to the extending direction of each sub-pixel. The extending direction D1 is perpendicular to the extending direction D2. However, the invention is not limited thereto.

The plurality of pixels P are arranged in a matrix along the extending direction D1 and the extending direction D2. FIG. 3 and FIG. 4 schematically show that the plurality of pixels P are arranged in a 4*5 matrix consisting of 4 horizontal rows (respectively extending along the extending direction D1) and 5 vertical rows (respectively extending along the extending direction D2). However, the arrangement of the plurality of pixels P and the number of the plurality of pixels P are not limited thereto.

The plurality of supporting members 144 overlap with the plurality of pixels P. In the present embodiment, the plurality of supporting members 144 are also arranged in a matrix. In other words, the plurality of supporting members 144 are regularly arranged instead of being scatteredly distributed in the electronically controlled shutter 14. FIG. 3 and FIG. 4 schematically show that the plurality of supporting members 144 are arranged in a 4*4 matrix, but the arrangement of the plurality of supporting members 144 and the number of the plurality of supporting members 144 are not limited thereto.

In the present embodiment, the matrix formed by the arrangement of the plurality of supporting members 144 may be divided into a plurality of shape units U having the same shape (FIG. 3 and FIG. 4 schematically label three shape units U). In other words, the matrix formed by the arrangement of the plurality of supporting members 144 is composed of a plurality of shape units U having the same shape. Each shape unit U is composed of any four supporting members 144 adjacent to one another. In other words, each edge of the shape unit U is a line connecting two adjacent supporting members 144.

The shape unit U composed of any four supporting members 144 adjacent to one another among the plurality of supporting members 144 has a third edge S3 and a fourth edge S4 adjacent to the third edge S3. The third edge S3 is a line connecting two adjacent supporting members 144 arranged in an extending direction D3, and the fourth edge S4 is a line connecting two adjacent supporting members 144 arranged in an extending direction D4. In the embodiments of FIG. 3 and FIG. 4, the shape unit U is in the shape of a parallelogram. In other words, the shape unit U includes two third edges S3 and two fourth edges S4, and the extending direction D3 of the third edge S3 is neither perpendicular nor parallel to the extending direction D4 of the fourth edge S4.

An angle between the third edge S3 and the first edge S1 (e.g., an angle θ1 between the extending direction D3 of the third edge S3 and the extending direction D1 of the first edge S1, not shown in FIG. 3; please refer to FIG. 4) may be larger than or equal to 0 degrees. In addition, the angle between the fourth edge S4 and the second edge S2 (e.g., an angle θ2 between the extending direction D4 of the fourth edge S4 and the extending direction D2 of the second edge S2) is larger than 0 degrees. In other words, at least a part of the supporting members 144 are not arranged along the extending direction D2 of the second edge S2 of the pixel P.

In the embodiment of FIG. 3, the extending direction D3 of the third edge S3 is parallel to the extending direction D1 of the first edge S1, and the extending direction D4 of the fourth edge S4 is neither parallel nor perpendicular to the extending direction D2 of the second edge S2. In other words, FIG. 3 shows the case where the angle between the third edge S3 and the first edge S1 (i.e., the angle θ1; please refer to FIG. 4) is equal to 0 degrees, and the angle between the fourth edge S4 and the second edge S2 (i.e., the angle θ2) is larger than 0 degrees. The main difference between FIG. 4 and FIG. 3 lies in that the plurality of supporting members 144 in FIG. 4 are rotated counterclockwise by an angle with respect to the plurality of pixels P based on the positions of the plurality of supporting members 144 in FIG. 3, so that the angle between the third edge S3 and the first edge S1 (i.e., the angle θ1) is larger than 0 degrees, and the angle between the third edge S3 and the first edge S1 (i.e., the angle θ1) is smaller than or equal to the angle between the fourth edge S4 and the second edge S2 (i.e., the angle θ2). Specifically, the sizes of the angle θ2 and the angle θ1 may be determined by the angle of rotation of the plurality of supporting members 144 with respect to the plurality of pixels P. The larger the angle of rotation, the larger the angle θ2 and the angle θ1. In addition, the invention does not limit the direction and angle of rotation of the plurality of supporting members 144. In an embodiment, the plurality of supporting members 144 may be rotated clockwise by an angle with respect to the plurality of pixels P. In addition, generally, the angle between the third edge S3 and the first edge S1 (i.e., the angle θ1) is smaller than the angle (not shown) between the fourth edge S4 and the first edge S1. In other words, in the shape unit U, an edge that forms a smaller angle with the first edge S1 is the third edge S3, and an edge that is adjacent to the above edge and forms a larger angle with the first edge S1 is the fourth edge S4. However, in an embodiment, the angle between the third edge S3 and the first edge S1 may be equal to the angle between the fourth edge S4 and the first edge S1. In that case, any edge of the shape unit U may be the third edge S3 (or the fourth edge S4).

The lengths of the first edge S1 and the second edge S2 are respectively X and Y. The lengths of the third edge S3 and the fourth edge S4 are respectively X' and Y'. In the present embodiment, X'≠Y', but the invention is not limited thereto.

Any four supporting members 144 adjacent to one another satisfy at least one of Condition 1 and Condition 2.

$$X'>X \text{ and } X'\neq nX;\quad\quad\quad\quad\quad\quad\text{Condition 1:}$$

$$Y'>Y \text{ and } Y'\neq nY, \text{ where } n \text{ is a positive integer.}\quad\text{Condition 2:}$$

According to Condition 1, the length X' of the third edge S3 of the shape unit U composed of any four supporting members 144 adjacent to one another is larger than the length X of the first edge S1 of each pixel P, and the length X' of the third edge S3 is not equal to an integral multiple of the length X of the first edge S1 of each pixel P. According to Condition 2, the length Y' of the fourth edge S4 of the shape unit U composed of any four supporting members 144 adjacent to one another is larger than the length Y of the second edge S2 of each pixel P, and the length Y' of the fourth edge S4 is not equal to an integral multiple of the length Y of the second edge S2 of each pixel P. In the embodiments of FIG. 3 and FIG. 4, any four supporting members 144 adjacent to one another satisfy both Condition 1 and Condition 2. In other words, the arrangement pitches of the plurality of supporting members 144 in the extending direction D3 and the extending direction D4 are respectively larger than the arrangement pitches of the plurality of pixels P in the extending direction D1 and the extending direction D2. In addition, the arrangement pitch of the plurality of supporting members 144 in the extending direction D3 is not equal to an integral multiple of the arrangement pitch of the plurality of pixels P in the extending direction D1, and the arrangement pitch of the plurality of supporting members 144 in the extending direction D4 is not equal to an integral multiple of the arrangement pitch of the plurality of pixels P in the extending direction D2, but the invention is not limited thereto. In another embodiment, any four supporting members 144 adjacent to one another may also satisfy only Condition 1 or only Condition 2.

In the embodiments of FIG. 3 and FIG. 4, any two adjacent shape units U share one of the third edges S3 or one of the fourth edges S4. Further, two shape units U adjacent in the extending direction D3 share the fourth edge S4. On the other hand, two shape units U adjacent in the extending direction D4 share the third edge S3, and the two adjacent shape units U sharing the third edge S3 are mirror-symmetrical on the two sides of the third edge S3. Specifically, in the embodiments of FIG. 3 and FIG. 4, the plurality of supporting members 144 in the $(m-1)^{th}$ horizontal row and the plurality of supporting members 144 in the $(m+1)^{th}$ horizontal row are aligned in a direction D5 perpendicular to the extending direction D3, but the plurality of supporting members 144 in the $m^{th}$ horizontal row and the plurality of supporting members 144 in the $(m-1)^{th}$ horizontal row (or the plurality of supporting members 144 in the $(m+1)^{th}$ horizontal row) are not aligned in the direction D5, where m is a positive integer greater than or equal to 2. In other words, the plurality of supporting members 144 in the $m^{th}$ horizontal row and the plurality of supporting members 144 in the $(m-1)^{th}$ horizontal row (or the plurality of supporting members 144 in the $(m+1)^{th}$ horizontal row) are staggered in the direction D5. In addition, the plurality of supporting members 144 in the $m^{th}$ horizontal row are, for example, deviated in the extending direction D3 by a distance based on the plurality of supporting members 144 in the $(m-1)^{th}$ horizontal row (or the plurality of supporting members 144 in the $(m+1)^{th}$ horizontal row), and the distance is equal to the length of an orthographic projection P4 of the fourth edge S4 on the third edge S3. In the embodiments of FIG. 3 and FIG. 4, the length of the orthographic projection P4 of the fourth edge S4 on the third edge S3 is smaller than the length X' of the third edge S3. In other words, the orthographic projection of each supporting member 144 of the $m^{th}$ horizontal row on the $(m-1)^{th}$ horizontal row (or the $(m+1)^{th}$ horizontal row) falls between two adjacent supporting members 144 in the $(m-1)^{th}$ horizontal row (or the $(m+1)^{th}$ horizontal row).

It is noted that FIG. 3 and FIG. 4 show that the third edge S3 of the shape unit U and the first edge S1 of the pixel P are parallel to the arrangement direction of the plurality of sub-pixels, and the supporting members in the odd-numbered horizontal rows and the supporting members in the even-numbered horizontal rows are staggered by a distance in the extending direction D3 of the third edge S3 (or in the extending direction D1 of the first edge S1), but the invention is not limited thereto. In another embodiment, the plurality of supporting members may be rotated by 90 degrees with respect to the plurality of pixels P based on the positions of the plurality of supporting members 144 in FIG. 3. Under this architecture, the supporting members in the odd-numbered vertical rows (i.e., the odd-numbered horizontal rows before rotation) and the supporting members in the even-numbered vertical rows (i.e., the even-numbered horizontal rows before rotation) are staggered by a distance in the extending direction D2 shown in FIG. 3. At this time, an edge of the shape unit U that is parallel to the extending direction of each sub-pixel is regarded as the third edge S3 of the shape unit U, and an edge of the pixel P that is parallel to the third edge S3 is regarded as the first edge S1 of the pixel P.

In summary of the above, in the embodiments of the invention, by configuring the arrangement pitch of the plurality of supporting members to be larger than the arrangement pitch of the pixels and arranging the plurality of supporting members in a staggered manner, the Moiré phenomenon resulting from stacking together components of two periodic arrangements can be improved. Therefore, the display module of the embodiments of the invention can exhibit excellent display quality.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A display module comprising:
    a display panel, comprising a plurality of pixels; and
    an electronically controlled shutter, overlapping with the display panel, wherein the electronically controlled shutter comprises a first polarizer, a second polarizer, a first conductive layer, a second conductive layer, a plurality of supporting members, and a display medium layer, the first conductive layer and the second conductive layer are located between the first polarizer and the second polarizer, and the supporting members are located between the first conductive layer and the second conductive layer to form a cell gap for accommodating the display medium layer,
    wherein each of the pixels has a first edge and a second edge adjacent to the first edge, a shape unit composed of any four supporting members adjacent to one another among the supporting members has a third edge and a fourth edge adjacent to the third edge, an angle between the third edge and the first edge is larger than or equal to 0 degrees, and an angle between the fourth edge and the second edge is larger than 0 degrees, and
    lengths of the first edge and the second edge are respectively X and Y, lengths of the third edge and the fourth edge are respectively X' and Y', and any four supporting members adjacent to one another satisfy at least one of Condition 1 and Condition 2, $X' > X$ and $X' \neq nX$;  Condition 1:

$Y' > Y$ and $Y' \neq nY$, where $n$ is a positive integer, and $X' \neq Y'$.  Condition 2:

2. The display module according to claim 1, wherein any four supporting members adjacent to one another satisfy both Condition 1 and Condition 2.

3. The display module according to claim 1, wherein the second polarizer is a reflective polarizer.

4. The display module according to claim 1, wherein the shape unit is in a shape of a parallelogram, the shape unit comprises two of the third edges and two of the fourth edges, and any two adjacent shape units share one of the third edges or one of the fourth edges.

5. The display module according to claim 4, wherein two adjacent shape units sharing the third edge are mirror-symmetrical on two sides of the third edge.

6. The display module according to claim 1, wherein a length of an orthographic projection of the fourth edge on the third edge is smaller than the length of the third edge.

7. The display module according to claim 1, wherein the angle between the third edge and the first edge is equal to 0 degrees, and the angle between the fourth edge and the second edge is larger than 0 degrees.

8. The display module according to claim 1, wherein the angle between the third edge and the first edge is larger than 0 degrees, and the angle between the third edge and the first edge is smaller than or equal to the angle between the fourth edge and the second edge.

9. The display module according to claim 1, wherein the supporting members are arranged in a matrix, and the matrix is composed of a plurality of the shape units.

* * * * *